United States Patent
Boemler

(10) Patent No.: US 8,212,200 B2
(45) Date of Patent: Jul. 3, 2012

(54) LINEAR DISTRIBUTED PIXEL DIFFERENTIAL AMPLIFIER HAVING MIRRORED INPUTS

(75) Inventor: Christian Boemler, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 12/826,120

(22) Filed: Jun. 29, 2010

(65) Prior Publication Data

US 2010/0302425 A1 Dec. 2, 2010

Related U.S. Application Data

(62) Division of application No. 12/433,225, filed on Apr. 30, 2009, now Pat. No. 7,772,537, which is a division of application No. 11/334,626, filed on Jan. 19, 2006, now Pat. No. 7,544,921.

(51) Int. Cl.
*H03F 3/08* (2006.01)
(52) U.S. Cl. .................. 250/214 A; 330/308
(58) Field of Classification Search .......... 250/208.1, 250/214 A, 214 R; 348/241; 330/308, 257
See application file for complete search history.

(56) References Cited

U.S. PATENT DOCUMENTS

| | | | |
|---|---|---|---|
| 5,493,423 A | 2/1996 | Hosier | |
| 6,084,229 A | 7/2000 | Pace et al. | |
| 6,246,043 B1 | 6/2001 | Merrill | |
| 6,392,485 B1 | 5/2002 | Doi et al. | |
| 6,717,616 B1 | 4/2004 | Afghahi et al. | |
| 6,919,551 B2 | 7/2005 | Barna et al. | |
| 2004/0069930 A1 | 4/2004 | Zarnowski et al. | |
| 2005/0082461 A1* | 4/2005 | Bock | 250/208.1 |
| 2005/0185078 A1 | 8/2005 | Segura-Puchades | |

FOREIGN PATENT DOCUMENTS

| | | | |
|---|---|---|---|
| EP | 1 026 880 A | 8/2000 | |
| EP | 1 117 249 A | 7/2001 | |
| EP | 1 301 028 A | 4/2003 | |

OTHER PUBLICATIONS

Written Opinion of the International Searching Authority, Jul. 31, 2008.

* cited by examiner

*Primary Examiner* — Thanh X Luu
(74) *Attorney, Agent, or Firm* — Dickstein Shapiro LLP

(57) ABSTRACT

A pixel circuit that partially incorporates an associated column amplifier into the pixel circuitry. By incorporating part of a mirrored amplifier into the pixel, noise from the pixel is reduced.

22 Claims, 9 Drawing Sheets

LINEAR DISTRIBUTED PIXEL DIFFERENTIAL AMPLIFIER HAVING MIRRORED INPUTS

This application is a divisional of application Ser. No. 12/433,225, filed Apr. 30, 2009 now U.S. Pat. No. 7,772,537, which is a divisional of application Ser. No. 11/334,626, filed Jan. 19, 2006 now U.S. Pat. No. 7,544,921, the entirety of which are hereby incorporated by reference.

FIELD OF THE INVENTION

The invention relates generally to digital image processing and more particularly to a method and apparatus for pixel readout.

BACKGROUND OF THE INVENTION

There is a current interest in CMOS active pixel imagers for possible use as low cost imaging devices. An exemplary pixel circuit of a CMOS active pixel sensor (APS) is described below with reference to FIG. 1. Active pixel sensors can have one or more active transistors within the pixel, can be made compatible with CMOS technologies, and promise higher readout rates compared to passive pixel sensors. FIG. 1 illustrates an exemplary pixel 4T cell 10 in an image sensor 5, where "4T" designates the use of four transistors to operate the pixel 10 as is commonly understood in the art. A 4T pixel has a photodiode 12, a transfer transistor a reset transistor 13, a source follower transistor 14, and a row select transistor 15. It should be understood that FIG. 1 shows the circuitry for the operation of a single pixel, and that in practical use there will be an M-by-N array of identical pixels arranged in rows and columns with the pixels of the array accessed using row and column select circuitry, as described in more detail below.

The photodiode 12 converts incident photons to electrons that are transferred to a storage node FD through transfer transistor 11. A source follower transistor 14 has its gate connected to node FD and amplifies the signal appearing at node FD. When a particular row containing pixel 10 is selected by the row select transistor 15, the signal amplified by transistor 14 is passed to a column line 17 to the readout circuitry. The photodiode 12 accumulates a photo-generated charge in a doped region of the substrate. It should be understood that the CMOS imager 5 might include a photogate or other photoconversion device, in lieu of a photodiode, for producing photo-generated charge.

A reset voltage source Vrst is selectively coupled through reset transistor 13 to node FD. The gate of transfer transistor 11 is coupled to a transfer control line which serves to control the transfer operation by which photodiode 12 is connected to node FD. The gate of reset transistor 13 is coupled to a reset control line, which serves to control the reset operation in which Vrst is connected to node FD. The row select control line is typically coupled to all of the pixels of the same row of the array. A supply voltage source is coupled to the source follower transistor 14. Although not shown in FIG. 1, column line 17 is coupled to all of the pixels of the same column of the array and typically has a current sink transistor 16 at one end. The gate of row select transistor 15 is coupled to row select control line.

As known in the art, a value is read from pixel 5 using a two-step process. During a reset period, node FD is reset by turning on reset transistor 13, and the reset voltage is applied to node FD and read out to column line 17 by the source follower transistor 14 (through the activated row select transistor 15). During a charge integration period the photodiode 12 converts photons to electrons. After the integration period the transfer transistor 11 is then activated, allowing the electrons from photodiode 12 to collect at node FD. The charges at node FD are amplified by source follower transistor 14 and selectively passed to column line 17 by row access transistor 15. As a result, the two different values—the reset voltage (Vrst) and the image signal voltage (Vsig)—are readout from the pixel 10 and sent by the column line 17 to readout circuitry, where each voltage is sampled and held for further processing as known in the art.

All pixels in a row are read out simultaneously onto respective column lines 17 and stored in respective sample and hold circuits. Then the column circuitry in the sample and hold circuits are activated for reset and signal voltage readout processing.

Typically, pixel readout has been accomplished with source follower transistor 14 in the pixel 10, selectable by row select transistor 15. This source follower transistor 14 has a gain less then unity (~0.8) due to the finite output impedance of the source follower transistor 14 and current sink transistor 16. In addition, the source follower transistor 14 is typically an N channel transistor in a grounded substrate, resulting in a gain non-linearity over the signal range due to back-gate bias (also known as body effect or bulk effect). Process variations can also cause a slightly different gain from one pixel to another. This combined with the non-linearity can add additional kTC noise and PRNU (photo-response non-uniformity) to the image sensor 5. Finally, the source follower settling time when selected can be quite prolonged due to low loop-gain and small source follower gain. This long settling time can both make the source follower transistor 14 subject to RTS (e.g., 1/f) noise as well as increase the row readout time causing lower frame rates. The RTS noise is typically caused by traps in the oxide under the source follower transistor 14. The RTS noise gets worse the longer the source follower transistor is amplifying a signal. If the pixel output settling time can be reduced, the RTS noise will improve dramatically.

FIG. 2 shows a CMOS active pixel sensor integrated circuit chip 2 that includes an array of pixels 10 and a controller 23 that provides timing and control signals to enable reading out of signals stored in the pixels in a manner commonly known to those skilled in the art. Exemplary arrays have dimensions of M-by-N pixels, with the size of the array 5 depending on a particular application. The imager is read out a row at a time using a column parallel readout architecture. The controller 23 selects a particular row of pixels in the array 5 by controlling the operation of row addressing circuit 21—the vertical addressing circuit—and row drivers 22. Charge signals stored in the selected row of pixels are provided on the column lines 17 (FIG. 1) to a readout circuit 25 in the manner described above. The pixel signals (reset voltage Vrst and image signal voltage Vsig) read from each of the columns can then be read out, sampled and held, subtracted (Vrst−Vsig) and the result sequentially sent to further processing such as digitization, using a column addressing circuit. Differential pixel signals (Vrst, Vsig) corresponding to the readout reset signal (Vrst) and image signal (Vsig) are provided as respective outputs Vout1, Vout2 of the readout circuit 25 for subtraction and subsequent processing. Alternatively, readout circuit 25 provides a combined differential signal of the two signals Vrst, Vsig.

As noted, the source follower transistor 14 limits output swing available for the pixel output signals, where the gain maybe limited to 0.8 of the signal applied to input gate of the source follower transistor, it would be desirable to increase the gain applied to pixel output signals.

BRIEF SUMMARY OF THE INVENTION

The invention provides a new APS pixel architecture capable of providing an increased gain for pixel output signals by integrating the pixel architecture with a differential amplifier in the column readout signal processing path. An exemplary embodiment of the invention has the source follower as part of an amplifier's differential input stage and has the majority of the differential amplifier reside as a column parallel circuit.

BRIEF DESCRIPTION OF THE DRAWINGS

The foregoing and other advantages and features of the invention will become more apparent from the detailed description of exemplary embodiments provided below with reference to the accompanying drawings in which.

DETAILED DESCRIPTION OF THE INVENTION

In the following detailed description, reference is made to the accompanying drawings, which are a part of the specification, and in which is shown by way of illustration various embodiments whereby the invention may be practiced. These embodiments are described in sufficient detail to enable those skilled in the art to make and use the invention. It is to be understood that other embodiments may be utilized, and that structural, logical, and electrical changes, as well as changes in the materials used, may be made without departing from the spirit and scope of the present invention.

Figure 3:
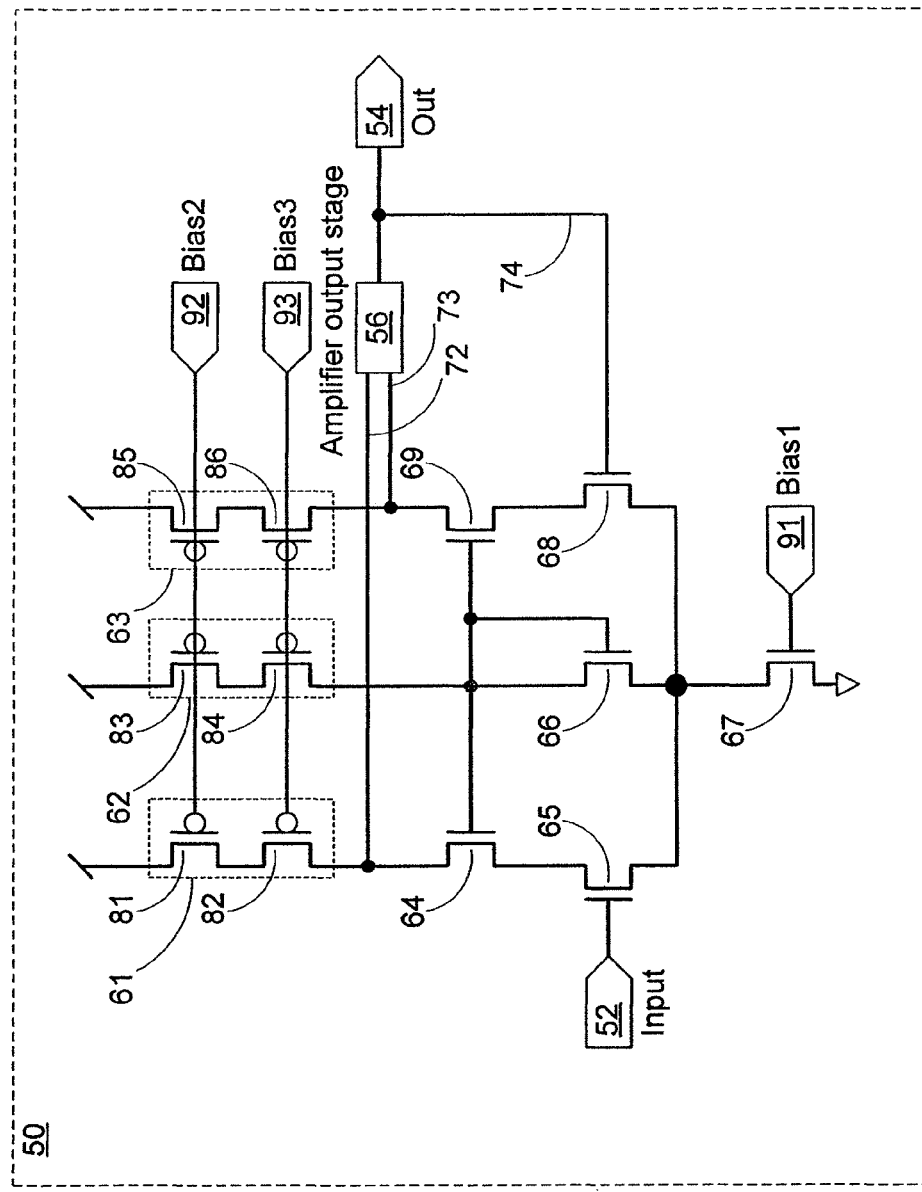
FIG. 3 is a block diagram of a conventional folded cascode amplifier.

Before describing the invention in detail, a brief description of a conventional differential amplifier is provided. FIG. 3 shows a conventional unity gain differential amplifier with differential input stage comprised of input transistors 65 and 68, tail current transistor 67, a load current 61, 62, and 63, cascode transistors 64, 69 and diode connected transistor 66, with circuits 61, 62 and 63 acting as current mirrors. Transistors 64 and 65 comprise the positive input leg and transistors 68 and 69 comprise the negative input leg. The outputs 72 and 73 of the input stage are fed to a differential output amplifier 56. The output of amplifier 56 provides an output voltage at terminal 54. The output voltage at terminal 54 is fed back by line 74 as an input to the gate of transistor 68. The negative feedback 74 in amplifier 56 implements a closed loop unity gain buffer. The voltage on the 'input' terminal 52 is buffered to output node 'Output' with a gain very close to unity. Diode connected N channel transistor 66 is biased by current mirror 62 to regulate a nearly constant Vds across input transistors 65 and 68 though cascode transistors 64 and 69 over the entire input common mode range. This provides improved CMRR (Common mode rejection ratio) which is directly related to unity gain buffer linearity. The regulated cascode input stage also provides a higher gain in the input stage allowing a lower output stage gain, which is turn limits the elements contributing to the entire amplifier input noise to only a few transistors. The output amplifier 56 can be any known amplifier output stage. It should also be noted that either/both current mirror 61 or 63 can be a diode connected with bias voltage being connected to either of the cascode transistor 64 or 69 drains depending on amplifier topology chosen.

Figure 4:
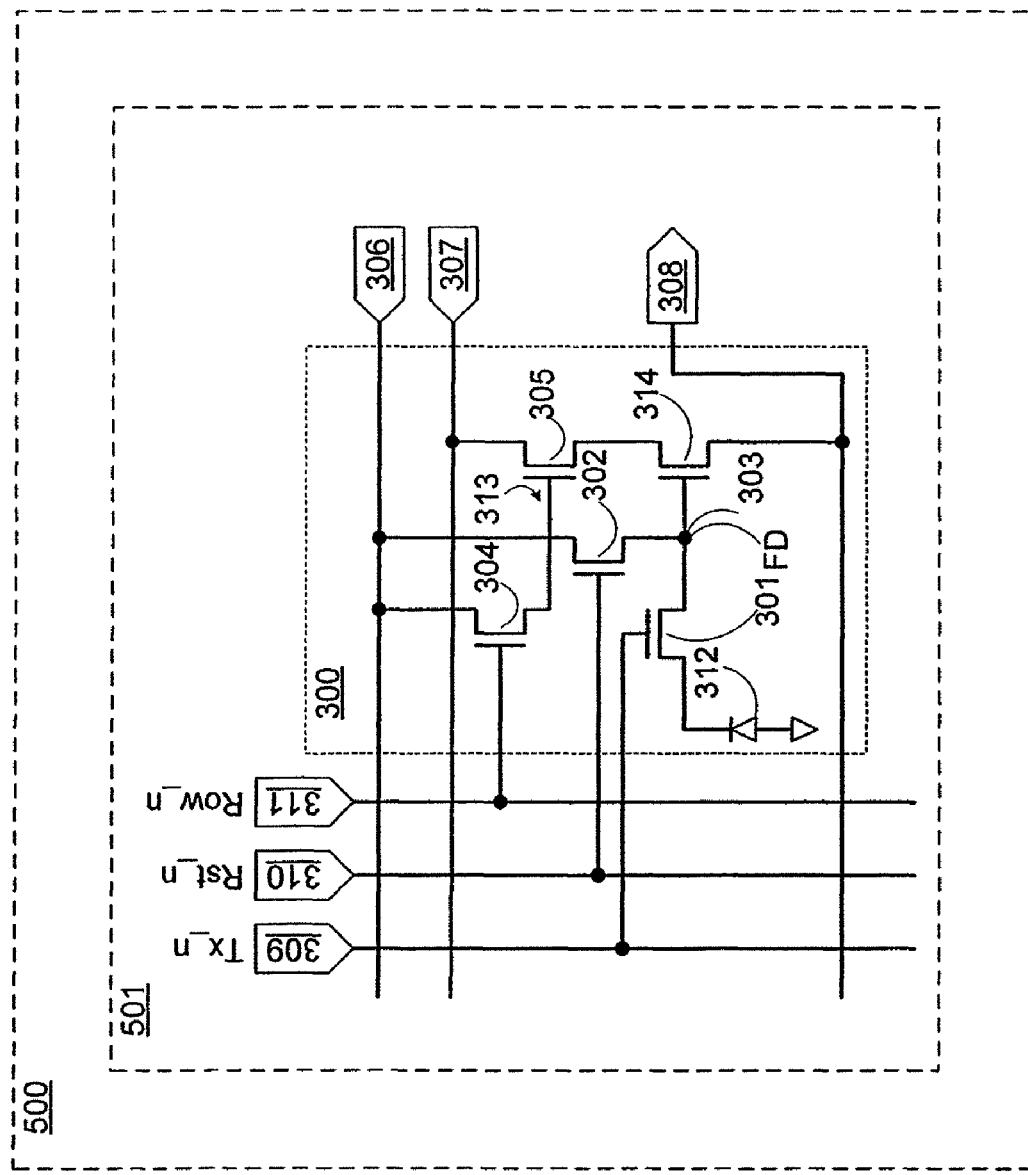
FIG. 4 is a pixel circuit in accordance with an exemplary embodiment of the invention.

The invention is now described with reference to FIGS. 4-9. FIG. 4 shows a portion of a pixel array 501 of an image processing system 500 including a pixel 300. Pixel 300 includes photodiode 312, transfer gate 301, floating diffusion region 303, and reset transistor 302. In addition, the pixel includes a differential input transistor 314, input cascode transistor 305, cascode sample transistor 304 and cascode holding node 313. Although described with respect to a photodiode, the invention is not so limited and any similar element maybe used that converts energy received in photons to charges.

The photodiode 312 is coupled to the gate of the positive differential input transistor 314 through the transfer transistor 301. The floating diffusion region 303 is located between the positive differential input transistor 314 and the transfer transistor 301. The gate of the transfer transistor 301 is coupled to transfer signal line Tx_n 309. One of the source/drain regions of the reset transistor 302 is coupled to the floating diffusion region 303 and the other source/drain region of the reset transistor 302 is coupled to cascode signal line 306. The gate of the reset transistor 302 is coupled to reset signal line Rst_n 310.

One of the source/drain regions of the input cascode transistor 305 is coupled to the positive differential input transistor 314 and the other source/drain region of input cascode transistor 305 is coupled to load line 307. The source/drain region of the positive differential input transistor 314 not coupled to the input cascode transistor 305 is coupled to load line 308. One source/drain region of the cascode sample transistor 304 is coupled to the gate of the input cascode transistor 305 and the other of the source/drain regions of cascode sample transistor 304 is coupled to cascode line 306. The gate of the cascode sample transistor 304 is coupled to the row select signal line Row_n 311.

Figure 5:
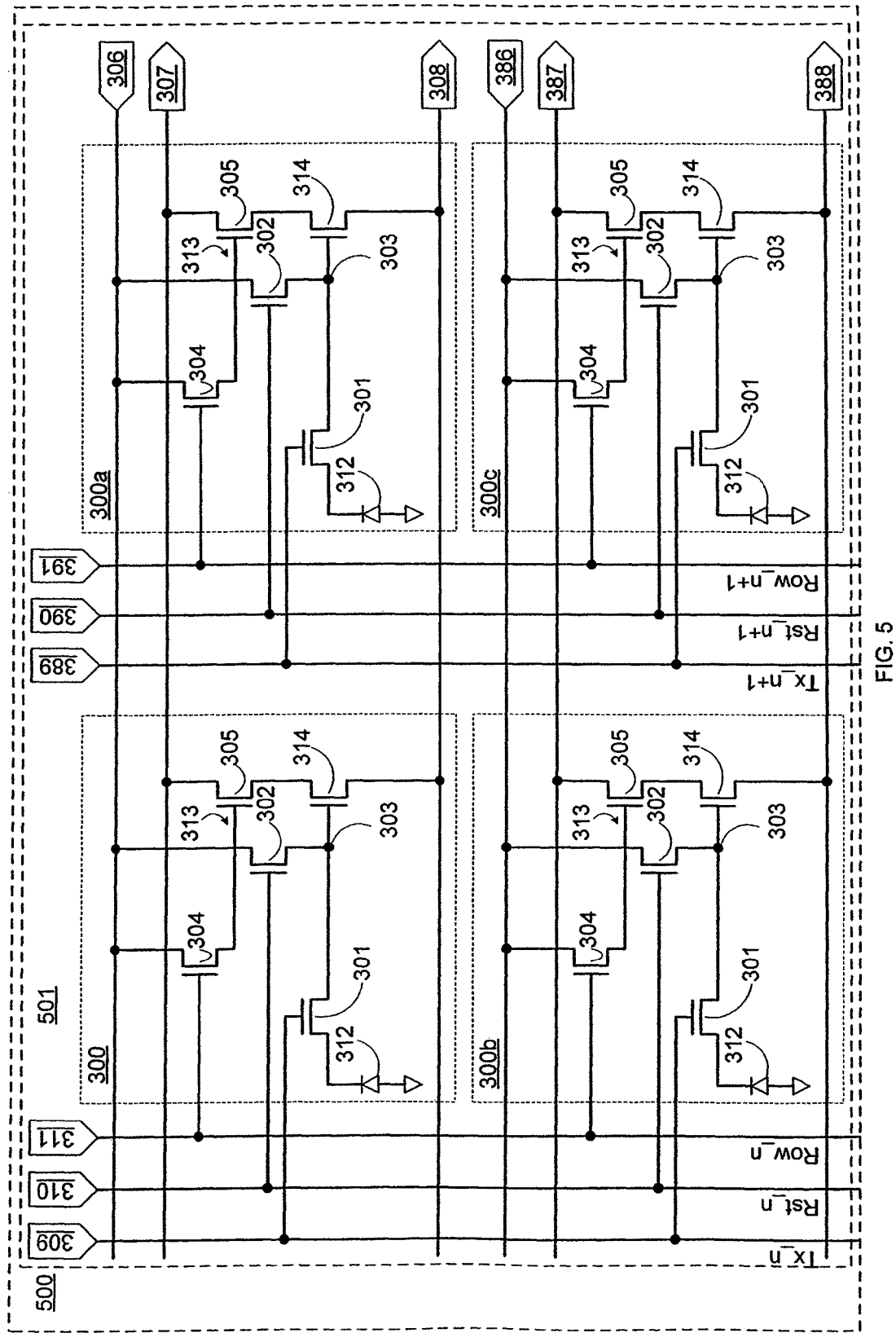
FIG. 5 is a portion of pixel array in accordance with an exemplary embodiment of the invention.

FIG. 5 depicts the pixel array 501 of FIG. 4 in the environment of larger portion of a pixel array 501. FIG. 5 depicts four pixels 300, 300a, 300b, and 300c of array 501 as part of the image processing system 500. As seen in FIG. 5, the pixels 300, 300a, 300b, and 300c are part of an array 501 having M rows×N columns, although only four pixels are shown. There are arrayed transfer control lines (i.e., Tx_n), reset control lines (i.e., Rst_n), and row select control lines (i.e., Row_n) routed along rows across all the columns of the array 501. For example, for the $n^{th}$ row, there is transfer control line Tx_n 309, reset control line Rst_n 310, and row select control line Row_n 311. Additionally, for the n+1 row, there is transfer control line Tx_n+1 389, reset control line Rst_n+1 390, and row select control line Row_n+1 391. There are also arrayed cascode control lines, top load lines, and bottom load lines routed along columns across all the rows of the array 501. For example, for the $m^{th}$ column, there is a cascode control line 306, top load line 307, and bottom load line 308. Additionally, for the $m^{th}$+1 column, there is a cascode control line 386, top load line 387, and bottom load line 388. The top and bottom load lines are the negative input transistors distributed across the columns of the pixel array 501.

As seen in FIGS. 4 and 5, a pixel 300 is accessed for a reset (and a readout) operation by enabling the associated cascode control line and the row line of the pixel and, ideally, disabling all other cascode control lines and row lines. Prior to performing a readout operation, it is desirable to perform an extinguish operation to clear or neutralize the pixel 300 from having any remaining signals in the pixel 300. To access pixel 300 for a readout, cascode line 306 and Row_n 311 are enabled, for example, by a logic "high" signal. Operation of the pixel 300 is described in greater detail below.

Figure 6:
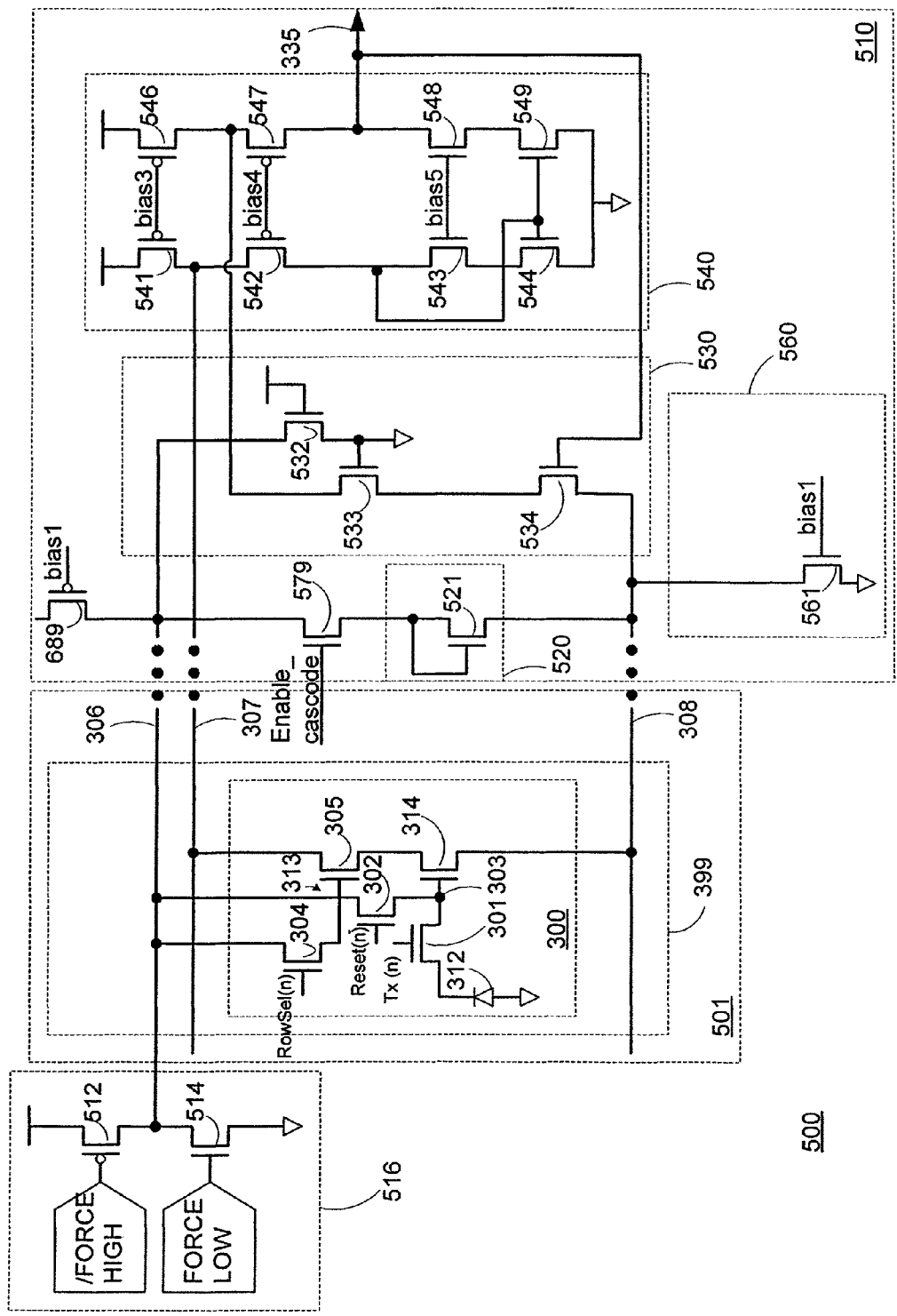
FIG. 6 is a portion of a column of pixel array and associated column amplifier circuitry in accordance with an exemplary embodiment of the invention.

FIG. 6 is a schematic diagram of one pixel 300 of pixel array 501 coupled to associated column amplifier circuitry in accordance with an exemplary embodiment of the invention. As seen in FIG. 6, the image processing system 500 includes pixel array 501, a forcing signal circuit 516, and a column amplifier 510. The pixel array 501 includes a plurality of rows and columns although only one pixel to be read out is shown. The pixel 300 shown in FIG. 6 is representational of one pixel in the pixel array 501 (as described with reference to FIGS. 4 and 5) belonging to the currently selected row and located in the same column as amplifier 510.

Column amplifier 510 includes a diode circuit 520, a negative input leg circuit 530, and a differential amplifier 540. Transistors containing diode connected transistor 521, and pixel transistors 304, 305 and 314 comprise the positive input leg for column amplifier 510. The negative input leg 530 of the column amplifier 510, is formed by transistors 532, 533 and 534. Thus, the negative input leg 530 includes transistors 532, 533, and 534 that complements positive input leg transistors 304, 305, and 314 in the pixel 300 of the same column. Tail current mirror 561 provides bias current for both positive input leg 304, 305, 314 and negative input leg 530.

The differential output amplifier 540 has two branches, one branch which includes transistors 541, 542, 543, and 544 and other branch which includes transistors 546, 547, 548, and 549. The gates of transistors 541 and 546 are coupled to an external bias voltage bias3, 542 and 547 are coupled to an external bias voltage bias4, 543 and 548 are coupled to an external bias voltage bias5, and 544 and 549 are connected as a wide swing cascoded current mirror. The output stage is identical to the well-known folded cascode amplifier topology. The input of one branch of the differential amplifier 540 is coupled to load line 307 and the input of other branch of the differential amplifier 530 is coupled to load line 308. The output of the differential amplifier 540 is provided both on line 335 to a downstream circuit and is fed back into the negative differential input transistor 534 to form a closed loop unity gain amplifier.

The diode circuit 520 couples cascode line 306 to load line 308 through a contact transistor 579. The contact transistor 579 is selectively enabled when reading out signals from pixel 300 in the column; transistor 579 is otherwise disabled to reduced power loss through the column amplifier 510 when either transistor in the forcing signal circuit 516 is active. Circuit 560 selectively couples bottom load line 308 to ground as controlled by bias1.

The forcing signal circuit 516 selectively controls coupling the cascode line 306 to either ground, to the supply voltage or leaves the cascode line 306 floating. The forcing signal circuit 516 includes an n-channel transistor 514 and a p-channel transistor 512. Cascode line 306 is coupled to a voltage source through transistor 512 and cascode line 306 is coupled to ground through transistor 514. Transistor 512 is closed by providing a logic low signal to its gate. Transistor 514 is closed by providing a logic high signal to it.

Figure 7:
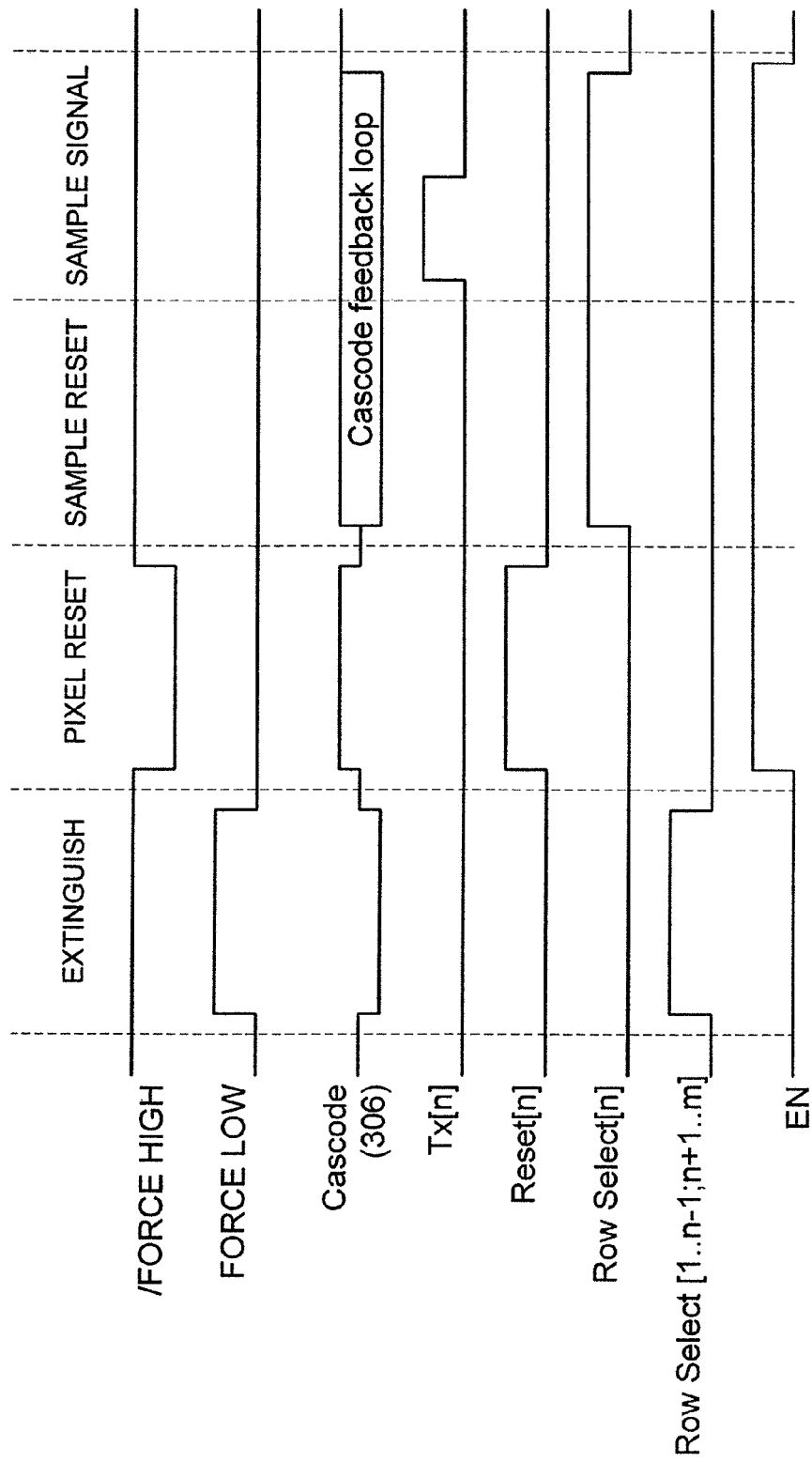
FIG. 7 is a timing diagram showing a method of operating the circuits of FIGS. 4-6.

The operation of imaging processing system 500 in reading out pixel reset Vrst and image Vsig signals is now described with reference to the simplified signal timing diagram of FIG. 7.

Before performing a reset or readout from a pixel 300, it is imperative that all cascode holding nodes 313 in all rows other than the currently selected rows are cleared of any residual signals and hold a voltage close to ground. Only the currently selected rows cascade holding node 313 is supposed to have a voltage significantly above ground. Accordingly, transistor 514 is activated by the Force low signal going high to couple cascode line 306 to ground while the Row_n voltage 311 in all rows except the currently selected are set high to pass the ground from cascode line 306 into cascode holding nodes 313. During this time the /Force High signal is high to keep transistor 512 turned off. The Row_n signals 311 for each row except the currently selected rows are returned to ground to sample-and-hold a voltage close to ground on all cascode holding nodes 313, independent of future cascode line 306 voltages. A voltage close to ground on cascode holding node 313 will effectively turn off cascode transistors 305 for all other rows than the currently selected rows and prevent any other row than the currently selected from influencing the readout.

In order to perform a reset of the pixel 300, the cascode signal line 306 is set to a high signal by applying a low signal on the /Force High input causing p-channel transistor 512 to conduct. At this time the Force low signal is set low turning off transistor 514. As a result, a supply voltage is coupled through transistor 512 to cascode line 306. The reset control line connected to the gate of transistor 302 is enabled by Reset (n) going high, thereby temporarily activating reset transistor 302 and coupling the floating diffusion region 303 to a supply voltage through the cascode line 306. To read out the floating diffusion reset signal, the Row_n signal 311 is then set high, thereby activating row transistor 304 and coupling the gate of input cascode transistor 305 to cascode line 306. The cascode line 306 is at a logic high so transistor 305 turns on, thereby coupling transistor 314 to the load line 307. The charge and related voltage on the floating diffusion region 303 controls how much differential input transistor 314 turns on and therefore how much of the tail current 561 flows from the load 307 to load 308 rather than through negative leg 530 and thereby affects the two inputs to the differential amplifier 540.

The linearity of the unity gain buffer in this mode of operation is better than a source follower, but still suffers due to poor CMRR as the two input stage cascode transistors 305 and 533 are forced high through transistor 512. To further improve linearity after the entire amplifier loop has settled, transistor 512 is turned off leaving the cascode line 306 floating and contact transistor 579 is then enabled. This instantiates a second regulation loop comprising load line 308, cascode diode 521, cascode line 306 through enabled cascode sample transistors 304 and 532 into cascode transistors 305 and 533. This loop becomes identical to diode coupled transistor 66 into cascode devices 64 and 69 in the known input stage architecture 50. FIG. 3 and FIG. 7 thereby relates in operation in this configuration by relating transistors 561 to 67, 314 to 65, 305 to 64, 534 to 68, 533 to 69 and 521 to 66. As a result, a reset signal is readout on line 335 from the pixel 300 through a column amplifier 510 to a downstream circuit.

The output on line 335 is fed back to transistor 534 which is in the negative input leg of differential amplifier 540 formed by transistors 534, 533, 532, all of which complement the positive input to differential amplifier 540 formed by transistors 314, 305, 304, a unity gain from selected row floating diffusion 303 to output line 335 is achieved which is applied to the pixel signal, which at this point is the reset signal Vrst. The Row_n signal 311 remains enabled, and the Tx_n signal 309 is enabled thereby temporarily closing transfer transistor 301 and coupling the photodiode 312 to the floating diffusion region 303 allowing the charge on the photodiode 312 to be transferred to the floating diffusion region 303. The charge on the floating diffusion region 303 controls how much differential input transistor 314 turns on and therefore how much charge flows from the load 307 to load line and affects the input of the amplifier 540. As a result, an image signal is readout from the pixel 300 through the column amplifier to a downstream circuit on line 335. As such, the feedback path from output line 335 to transistor 534 sets a unity gain.

The output on line 335 can be fed to a conventional sample and hold circuit which captures the reset Vrst and image Vsig signals. By incorporating part of a column differential amplifier into the pixel circuit the variances of the kTC noise and other noise sources common to the two samples is reduced—a technique well known as CDS (correlated double sampling).

Figure 8:
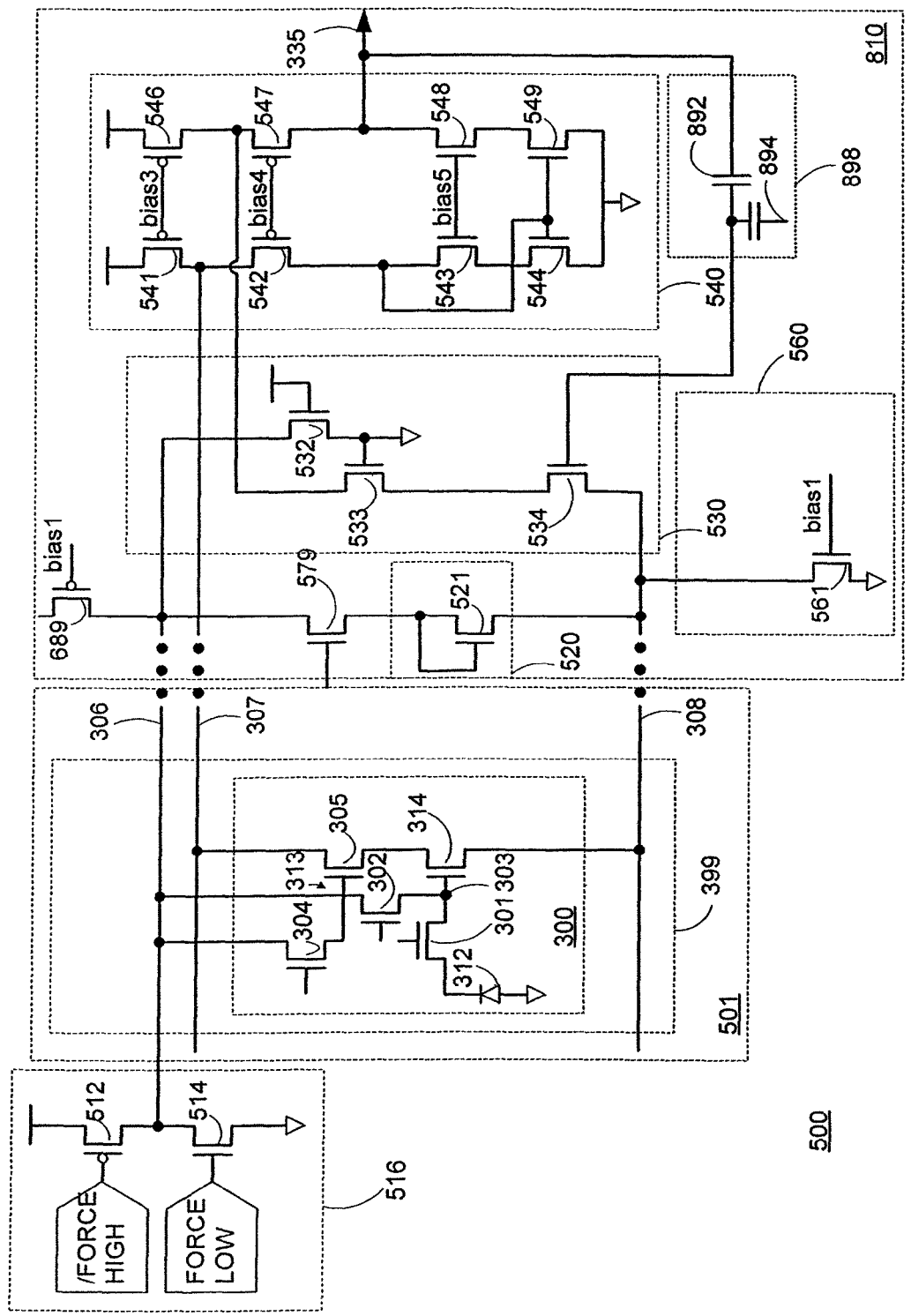
FIG. 8 is a pixel circuit in accordance with another exemplary embodiment of the invention.

FIG. 8 is a pixel circuit in accordance with another exemplary embodiment of the invention. The pixel circuit of FIG. 8 is similar to the pixel circuit of FIG. 6 except that the pixel circuit of FIG. 8 includes circuit 898 in the feedback path between output 335 and transistor 534. As the amplifier circuit of FIG. 6 is set up as a unity gain circuit, it may be desirable an increase the gain of the signal processed beyond unity. Circuit 898 controls the amount of feedback applied to transistor 534. The amplifier gain can be set by adjusting the values of the voltage dividing capacitors 892, 894. As is conventionally known, by varying the values of the capacitors in circuit 898, the gain of amplifier circuit 810 can be adjusted. To properly operate, feedback capacitors in circuit 898 needs reset circuitry (not shown). It is possible to incorporate CDS by resetting the feedback capacitor 892 during Vrst readout.

Figure 1:
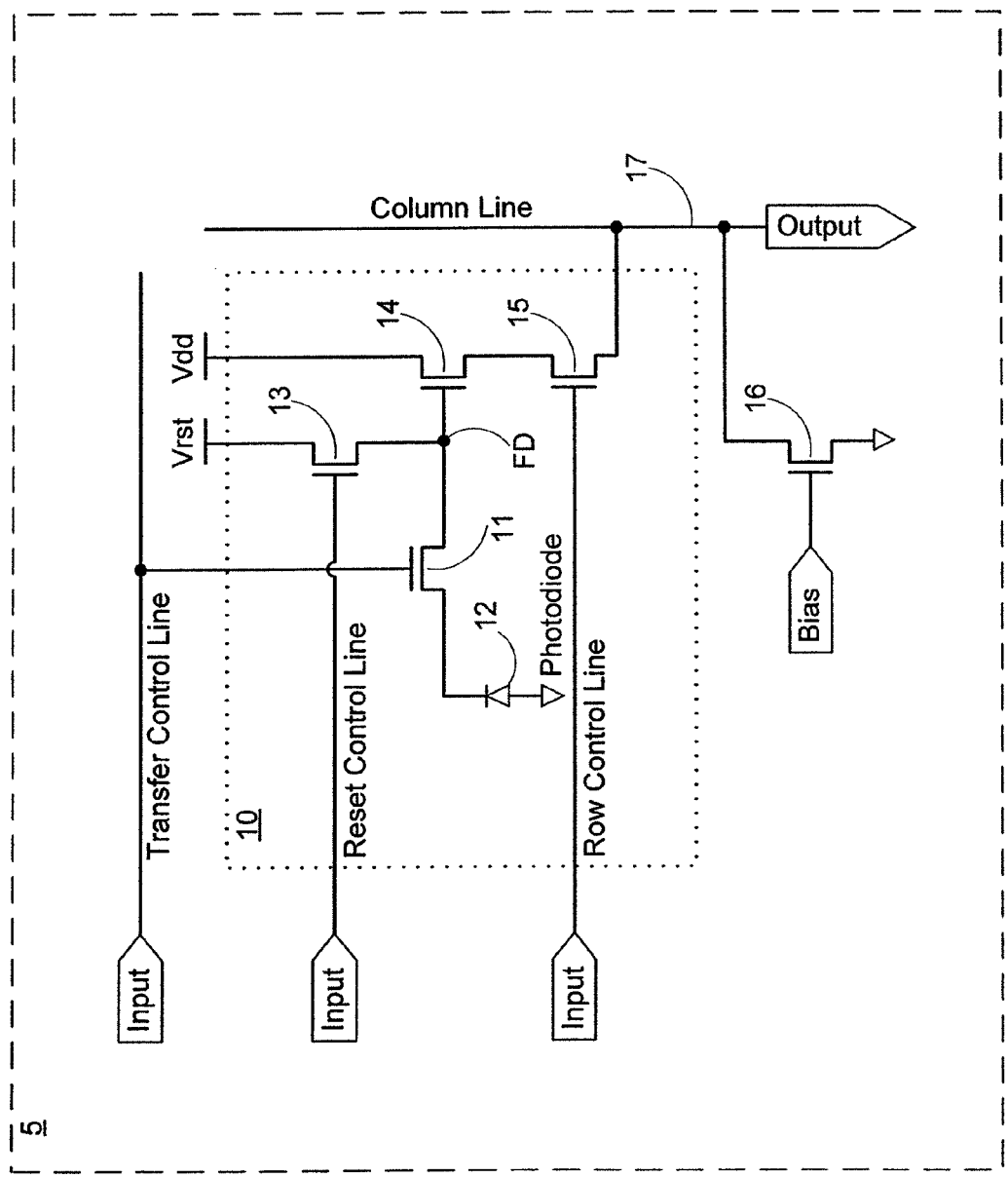
FIG. 1 is a block diagram of a conventional active pixel.
Figure 2:
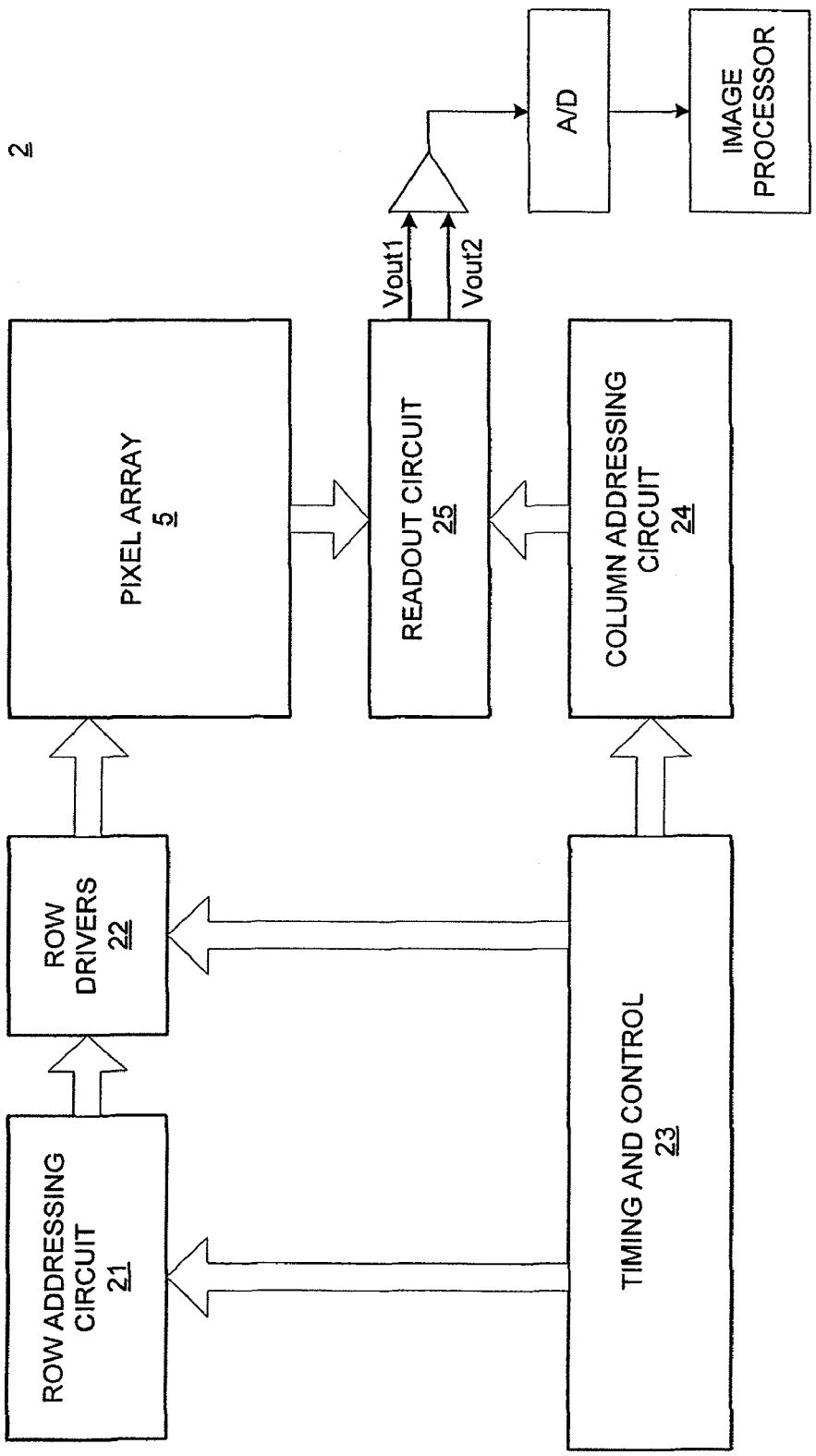
FIG. 2 is a block diagram of a conventional imaging chip.
Figure 9:
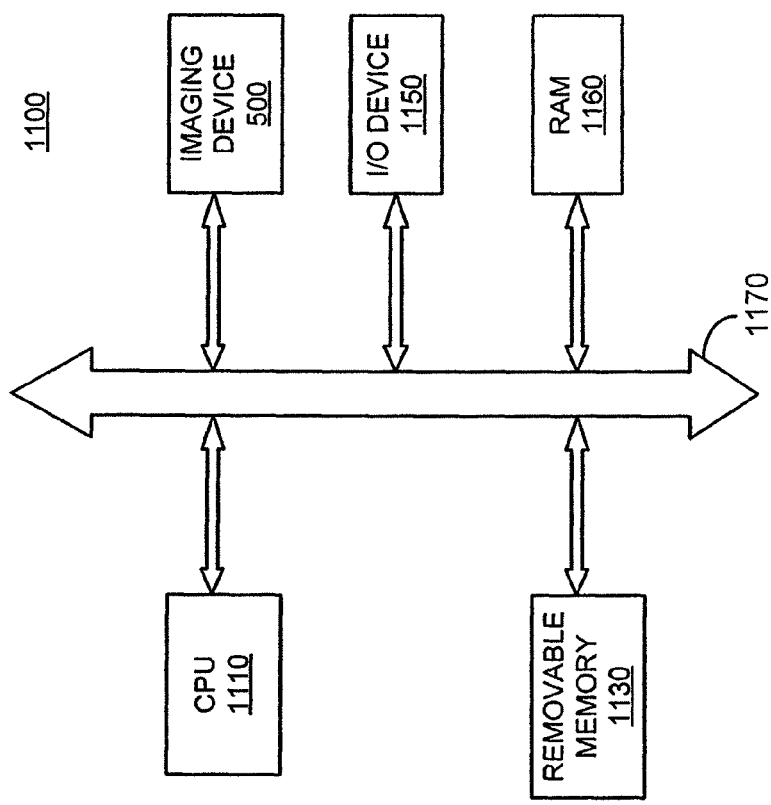
FIG. 9 is a block diagram representation of a processor-based system incorporating a CMOS imaging device in accordance with an exemplary embodiment of the invention.

The invention may be employed in the pixel array readout circuit depicted in FIG. 2, which in turn may be coupled to a processing system. FIG. 9 shows a processing system 1100, which includes an imaging processing device 500 having the general construction of FIG. 2 and employing the invention described with respect to FIGS. 4-8 as part of the readout circuit. The system 1100 is exemplary of a system having digital circuits that could include image sensor devices. Without being limiting, such a system could include a computer system, camera system, scanner, machine vision, vehicle navigation, video phone, surveillance system, auto focus system, star tracker system, motion detection system, image stabilization system, and other image acquisition or processing system.

System 1100, for example a camera system, generally comprises a central processing unit (CPU) 1110, such as a microprocessor, that communicates with an input/output (I/O) device 1150 over a bus 1170. Imaging processing device 500 also communicates with the CPU 1110 over the bus 1170. The system 1100 also includes random access memory (RAM) 1160, and can include removable memory 1130, such as flash memory, which also communicate with the CPU 1110 over the bus 1170. The imaging processing device 100 may be combined with a processor, such as a CPU, digital signal processor, or microprocessor, with or without memory storage on a single integrated circuit or on a different chip than the processor.

It should be appreciated that other embodiments of the invention include a method of manufacturing the system 1100. For example, in one exemplary embodiment, a method of manufacturing a CMOS readout circuit includes the steps of fabricating, over a portion of a substrate an integrated single integrated circuit, at least an image sensor with a readout circuit as described above with respect to FIGS. 4-9 using known semiconductor fabrication techniques.

While the invention has been described and illustrated with reference to specific exemplary embodiments, it should be understood that many modifications and substitutions could be made without departing from the spirit and scope of the invention. Accordingly, the invention is not to be considered as limited by the foregoing description but is only limited by the scope of the claims.

The invention claimed is:

1. A pixel for an imaging system, said pixel comprising:
   a pixel readout circuit which is selectable;
   a positive differential input transistor;
   an input cascode transistor, wherein one of a source or drain of said input cascode transistor is coupled to one of a source or drain of said positive differential input transistor;
   a cascode sample transistor, wherein one of a source or drain of said cascode sample transistor is coupled to a gate of said input cascode transistor; and
   a differential column readout circuit that forms a part of a column amplifier for providing a pixel output signal and comprising one input which can be selectively coupled to said pixel readout circuit and another input which can be selectively coupled to a negative input leg circuit receiving an output of said column amplifier.

2. A pixel as in claim 1, further comprising a transfer transistor, wherein one of a source or drain of said transfer transistor is coupled to a gate of said positive differential input transistor.

3. A pixel as in claim 2, further comprising a floating diffusion region coupled between said transfer transistor and said positive differential input transistor.

4. A pixel as in claim 3, further comprising a photo reception region coupled to one of a source or drain of said transfer transistor on the other side of said positive differential input transistor.

5. A pixel as in claim 3, further comprising a reset transistor coupled to said floating diffusion region.

6. A pixel as include claim 5, wherein one of a source or drain of said cascode sample transistor on the other side of said input cascode transistor is coupled to an associated cascode signal line, wherein the gate of said cascode sample transistor is coupled to an associated row select signal line.

7. A pixel as include claim 6, wherein one of a source or drain of said input cascode transistor on the other side of said positive differential input transistor is coupled to an associated top load line.

8. A pixel as include claim 7, wherein one of a source or drain of said reset transistor on the other side of said floating diffusion region is coupled to said associated cascode signal line, wherein the gate of said reset transistor is coupled to an associated reset control line.

9. A pixel as include claim 8, wherein the gate of said transfer transistor is coupled to an associated transfer control line.

10. A pixel as include claim 9, wherein one of a source or drain of said positive differential input transistor on the other side of said input cascode transistor is coupled to an associated bottom load line.

11. A pixel as in claim 6, wherein said cascode signal line is selectively controlled by a forcing signal circuit.

12. An imaging system, comprising:
a pixel array comprising:
   a plurality of pixels, each pixel comprising:
      a pixel readout circuit which is selectable;
      a positive differential input transistor;
      an input cascode transistor, wherein one of a source or drain of said input cascode transistor is coupled to one of a source or drain of said positive differential input transistor;
      a cascode sample transistor, wherein one of a source or drain of said cascode sample transistor is coupled to a gate of said input cascode transistor; and
      a differential column readout circuit that forms a part of a column amplifier for providing a pixel output signal and comprising one input which can be selectively coupled to said pixel readout circuit and another input which can be selectively coupled to a negative input leg circuit receiving an output of said column amplifier.

13. A system as in claim 12, further comprising a transfer transistor, wherein one of a source or drain of said transfer transistor is coupled to a gate of said positive differential input transistor.

14. A system as in claim 13, further comprising a floating diffusion region coupled between said transfer transistor and said positive differential input transistor.

15. A system as in claim 14, further comprising a photo reception region coupled to one of a source or drain of said transfer transistor on the other side of said positive differential input transistor.

16. A system as in claim 14, further comprising a reset transistor coupled to said floating diffusion region.

17. A system as include claim 16, wherein one of a source or drain of said cascode sample transistor on the other side of said input cascode transistor is coupled to an associated cascode signal line, wherein the gate of said cascode sample transistor is coupled to an associated row select signal line.

18. A system as include claim 17, wherein one of a source or drain of said input cascode transistor on the other side of said positive differential input transistor is coupled to an associated top load line.

19. A system as include claim 18, wherein one of a source or drain of said reset transistor on the other side of said floating diffusion region is coupled to said associated cascade signal line, wherein the gate of said reset transistor is coupled to an associated reset control line.

20. A system as include claim 19, wherein the gate of said transfer transistor is coupled to an associated transfer control line.

21. A system as include claim 20, wherein one of a source or drain of said positive differential input transistor on the other side of said input cascode transistor is coupled to an associated bottom load line.

22. A system as in claim 17, wherein said cascode signal line is selectively controlled by a forcing signal circuit.

* * * * *

UNITED STATES PATENT AND TRADEMARK OFFICE
CERTIFICATE OF CORRECTION

PATENT NO. : 8,212,200 B2
APPLICATION NO. : 12/826120
DATED : July 3, 2012
INVENTOR(S) : Christian Boemler Page 1 of 1

It is certified that error appears in the above-identified patent and that said Letters Patent is hereby corrected as shown below:

In column 10, line 17, in Claim 19, delete "cascade" and insert -- cascode --, therefor.

Signed and Sealed this
Twenty-eighth Day of August, 2012

David J. Kappos
*Director of the United States Patent and Trademark Office*